Nov. 30, 1954  W. L. POLLARD  2,695,533
HYDROTORQUE CONVERTER PLANETARY TRANSMISSION
WITH FORWARD AND REVERSE DRIVE
Original Filed July 5, 1947  2 Sheets-Sheet 1
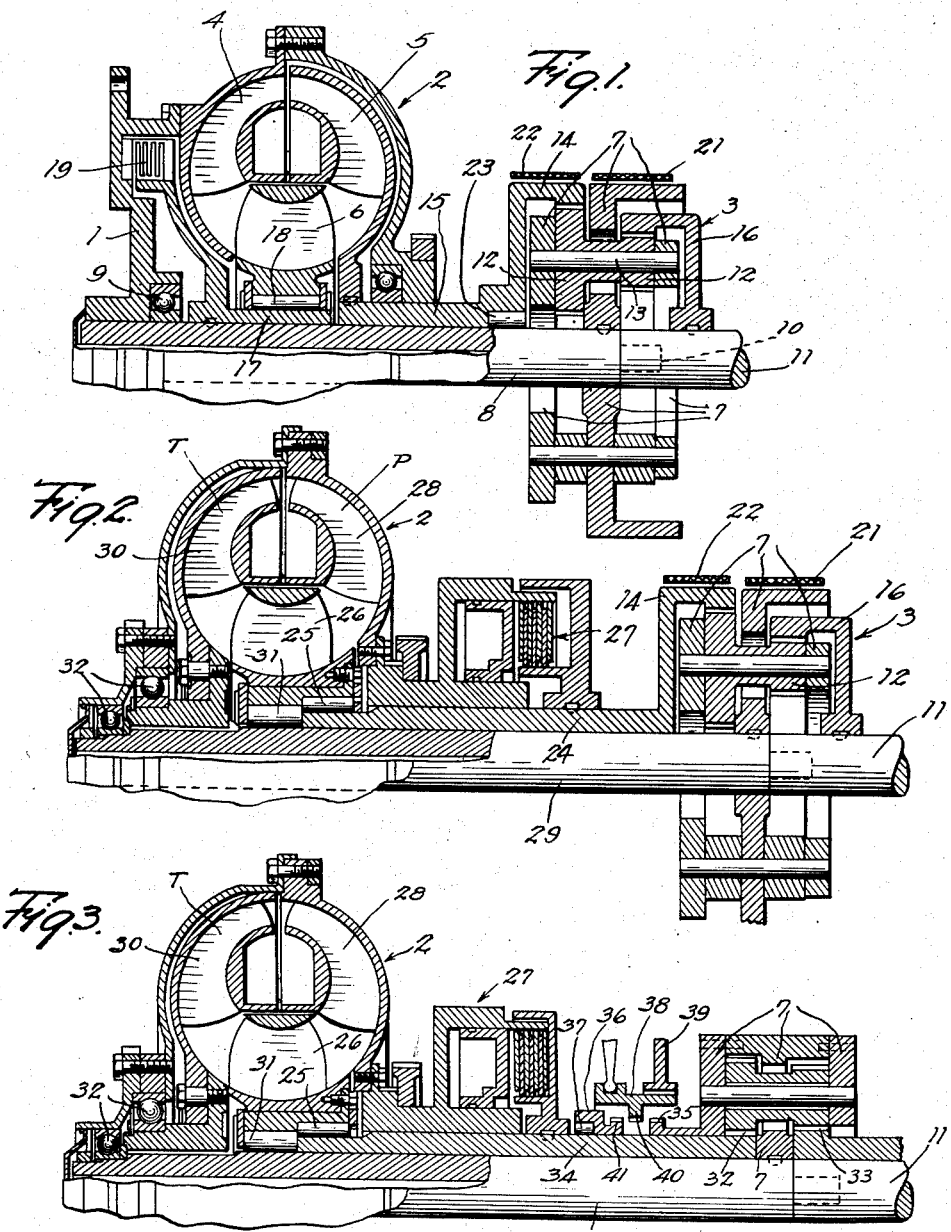
INVENTOR.
Willard L. Pollard
BY
Thiess, Olson & Mecklenburg
Attys.

Nov. 30, 1954  W. L. POLLARD  2,695,533
HYDROTORQUE CONVERTER PLANETARY TRANSMISSION
WITH FORWARD AND REVERSE DRIVE
Original Filed July 5, 1947  2 Sheets-Sheet 2
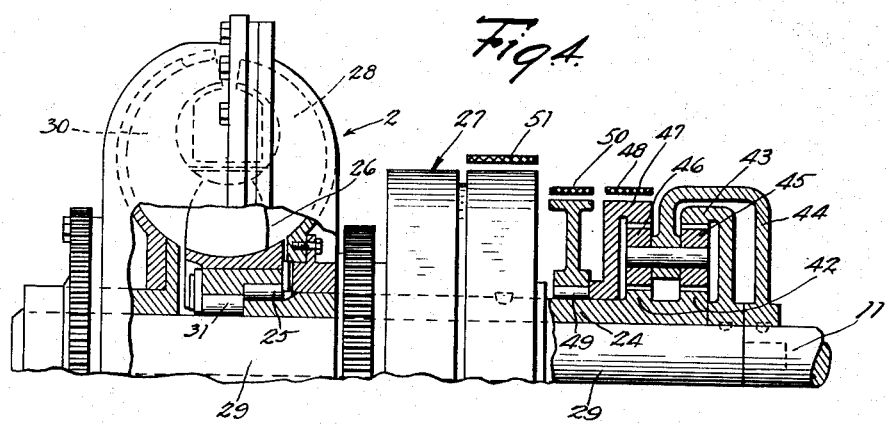
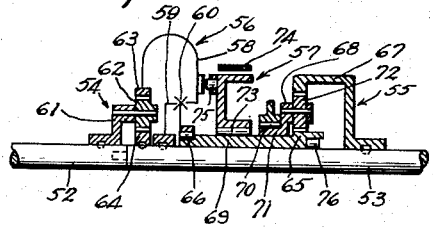
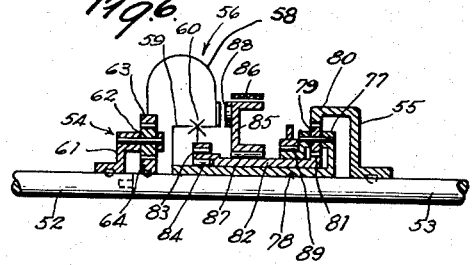
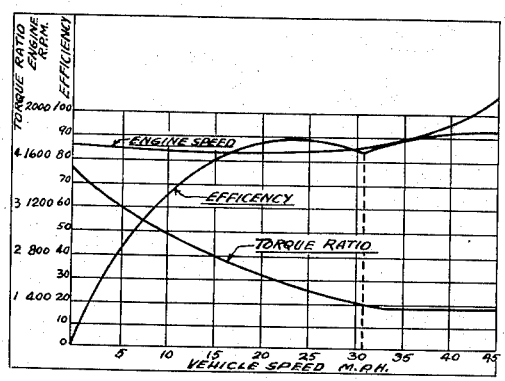
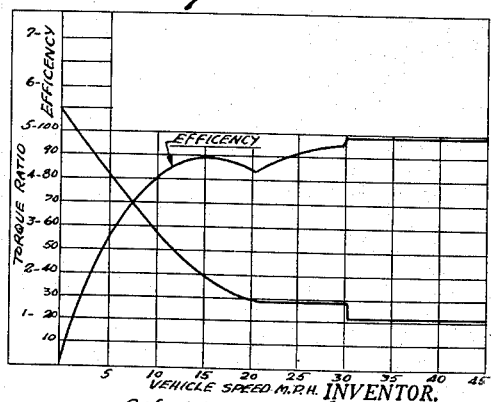
INVENTOR.
Willard L. Pollard.
BY
Thiess, Olson & Mecklenburger
Attys.

United States Patent Office 2,695,533
Patented Nov. 30, 1954

2,695,533

HYDROTORQUE CONVERTER PLANETARY TRANSMISSION WITH FORWARD AND REVERSE DRIVE

Willard L. Pollard, Evanston, Ill.

Continuation of application Serial No. 759,234, July 5, 1947. This application July 8, 1953, Serial No. 366,752

10 Claims. (Cl. 74—677)

This application is a continuation of my co-pending application Serial No. 759,234, filed July 5, 1947.

My invention relates to hydro torque converter planetary transmissions with forward and reverse drive.

One of the objects of my invention is to provide an improved hydro torque converter planetary transmission having two turbine rotors or runners, one urged in the same direction as the impeller and the other urged in the opposite direction with provisions by means of which either one of the runners may be held against rotation to cause rotation of the other runner in which at high forward speeds the power flow may be made to bypass the fluid part of the transmission, thus eliminating heat loss and increasing efficiency.

A further object is to provide such a transmission which will be compact.

A further object is to provide a simple, efficient, durable gear construction.

Further objects and advantages of the invention will be apparent from the description and claims.

In the drawings, in which several forms of my invention are shown,

Figure 1 is an axial sectional view of a hydro planetary transmission;

Fig. 2 is an axial sectional view showing another form;
Fig. 3 is an axial sectional view showing another form;
Fig. 4 is an axial sectional view showing another form;
Fig. 5 is an axial sectional view showing another form;
Fig. 6 is an axial sectional view showing another form;
Figs. 7 and 8 are charts showing speed, torque and efficiency curves.

Referring first to Fig. 1, the construction shown therein comprises a drive rotor 1 which may be connected with the motor of an automotive vehicle, a hydraulic torque converter 2 of the Fottinger type, and a planetary gear construction 3 associated with the hydraulic torque converter.

The converter comprises a bladed impeller or pump rotor 4 secured to rotate with the drive rotor 1, a bladed combination turbine and reactance rotor 5 urged to rotate in the same direction as the impeller rotor, and a bladed reactance and turbine rotor 6 urged to rotate in the opposite direction from that of the impeller rotor.

The planetary gearing comprises a planet gear carrier or cage 7 secured to a shaft 8, the front end of which shaft is mounted in a bearing 9 in the drive rotor and the rear end of which is piloted at 10 in the propeller shaft 11, a plurality of duplex planet gears 12 mounted on pins 13 extending between the cheek plates of the cage or gear carrier 7, a ring gear 14 meshing with the larger gears of the duplex planet gears 12 and rotatable with a tubular shaft 15 secured to the turbine rotor 5, and a ring gear 16 meshing with the smaller gears of the duplex planet gears 12 and secured to rotate with the propeller shaft 11. The shaft 8, which carries the central plate of the gear carrier 7 has keyed thereto a sleeve 17 having a one-way roller clutch connection 18 with the reaction turbine and having a friction clutch connection 19 with the drive rotor 1. The shaft 8 has a one-way roller clutch connection 23 with the shaft 15.

A friction brake 21 is provided for holding the cage 7 against rotation, to effect forward drive. Another friction brake 22 is provided for holding the ring gear 14 against rotation, to effect reverse drive.

In use, for forward low speed fluid drive, the clutch 19 is released, the brake 22 is released, and the brake 21 is applied. With this setting, as the motor drives the impeller rotor 4, the turbine rotor 5 will be urged in the same direction as the impeller rotor 4, and the reaction rotor 6 will be urged in the reverse direction. The reaction rotor 6, however, will be held against rotation by the one-way clutch 18, since the shaft 8 is held against reverse rotation by the brake 21. This will give the usual variable torque increase between the impeller rotor 1 and the turbine rotor 5. As the turbine speed increases, the reaction on the reaction rotor 6 will decrease and finally become zero, after which it will begin to travel in the same direction as the pump rotor, but leaving the shaft 8 held stationary by the brake 21. Due to the proportions of the duplex planet gears 12 and the ring gears 14 and 16 the ring gear 16 will be driven in the same direction as the ring gear 14 but at a lower speed. With the proportions shown, the top speed ratio may be about .6 to 1.0.

In order to secure a higher speed ratio and eliminate the transmission of power through the fluid converter for high speeds, the brake 21 is released, the clutch 19 is operated to connect the shaft 8 and the cage 7 carried thereby to rotate with the drive rotor 1, a one-way clutch 23 being provided between the shaft 8 and the tubular shaft 15 so that the rotation of the shaft 8 will carry the tubular shaft 15 along with it, thus causing the planetary gearing 3 to rotate as a unit with the drive rotor.

In this form of planetary gearing it will be noted that the ring gears 14 and 16 surround the planet gears 12, thus lessening the effect of centrifugal action on the bearing pins 13.

For reverse, the clutch 19 is released, the brake 21 is released and the brake 22 is applied. The application of the brake 22 holds the turbine rotor 5 against rotation, causing reverse rotation of the reaction turbine or rotor 6. The reverse rotation of the reaction turbine rotates the cage or gear carrier 7 in a reverse direction. As the ring gear 14 is held against rotation, this reverse rotation of the cage will cause a reverse rotation of the ring gear 16 and propeller shaft 11 but at a slower speed than the reverse rotation of the shaft 8. By choosing various ratios of the pitch diameters of the small gears and large gears the desired speed of reverse rotation and of slow speed forward rotation for a given condition may be obtained.

The construction shown in Fig. 2 is quite similar to that described in Fig. 1. The planetary construction 3, including the ring gears 14 and 16, gear carrier 7, planet gears 12 and the two brakes 21 and 22 are substantially identical. In this form, the ring gear 14 is secured to a sleeve 24 having a one-way clutch connection 25 with the reaction rotor 26. This sleeve 24 also has a friction clutch connection 27 with the impeller rotor 28. The cage 7 is keyed on a shaft 29 which is secured to rotate with the turbine rotor 30. A one-way clutch 31 is provided between the reaction rotor 26 and this shaft 29. Suitable bearings 32 are provided for the turbine rotor 30 and the shaft 29.

The operation of this form is substantially the same as that described in connection with Fig. 1. For slow speed forward rotation the clutch 27 is released, the brake 22 is applied, and the brake 21 is released. The rotation of the impeller rotor 28 will urge the turbine rotor 30 to rotate in the same direction and will exert a reactive force in the reaction rotor 26, tending to urge it in a reverse direction. It is, however, held against reverse rotation by the one-way clutch 25 and brake 22. This will cause the usual variable torque on the turbine 30. This will drive the cage 7 at the same speed as the turbine. Since the ring gear 14 is held, the ring gear 16 on the propeller shaft 11 will be driven in the same direction as the cage 7 but at a slower speed due to the difference in pitch diameters of the gears. When the torque converter changes from converter to coupler action, the reaction rotor 26 will free itself from the sleeve 24 and turn in the same direction as the turbine rotor 30.

For direct drive, the clutch 27 is operated to connect the ring gear 14 with the impeller rotor 28. This will cause the reaction rotor 26 to rotate with the impeller rotor 28 due to the one-way clutch 25, and this will cause the gear carrier 7 and shaft 29 to rotate with the reaction rotor 26 due to the one-way clutch 31.

For reverse rotation the clutch 27 is disconnected, the brake 22 is released, and the brake 21 is applied. This will hold the cage 7 and turbine rotor 30 against rotation and will cause reverse rotation of the reaction rotor 26. The reverse rotation of the reaction rotor 26 will cause reverse rotation of the ring gear 14 due to the one-way clutch 25. The reverse rotation of this ring gear 14 will cause reverse rotation of the ring gear 16 on the propeller shaft but at a slower speed due to the difference in pitch diameters of the gears.

The construction shown in Fig. 3 is quite similar to that shown in Fig. 2. The hydro planetary construction may be identical therewith. The planetary gearing is similar except that external spur gears 32 and 33 are substituted for the internal spur gears 14 and 16 of Fig. 2. In place of the friction band brakes 22 and 21 a dog-clutch-like brake construction is substituted. The friction clutch 27 may be the same as in Fig. 2. In this construction the smaller sun gear 32 is secured to a sleeve 34 having a one-way clutch connection 25 with the reaction rotor 26. The larger sun gear 33 is secured to rotate with the propeller shaft 11. The cage on which the planet gears 12 are mounted is secured to the shaft 29 on which the turbine rotor 30 is keyed. The dog clutch brake construction comprises a toothed ring 35 rotatable with the cage 7, a toothed ring 36 having a one-way clutch connection 37 with the tubular shaft 34, and a toothed ring 38 splined in a nonrotatable mounting 39 and having its teeth 40 engageable in one position with the toothed ring 35 on the cage and in the other position with the toothed ring 41 on the one-way clutch ring 36.

In use for slow speed forward drive the clutch 27 is disconnected and the brake ring 38 is moved to hold the one-way clutch ring 36 against rotation. As the impeller 28 rotates it exerts an action on the turbine rotor 30 and reaction rotor 26 as described in connection with Figs. 1 and 2. The forward rotation of the turbine rotor 30 will cause forward rotation of the cage 7. As the smaller sun gear 32 is held against rotation by the one-way clutch 37 the larger sun gear 33 on the propeller shaft will be rotated in the same direction as the cage 7 but at a slower speed. The fluid action will eventually change from torque converter action to coupler action. In order to eliminate the fluid action of the converter, thus lessening heat losses and increasing efficiency, the clutch 27 may be operated to connect the sleeve 34 and sun gear 32 with the impeller rotor 28. The one-way clutch 37 enables the tubular shaft 34 to turn without releasing the toothed ring 41. The sleeve 34 drives the shaft 29 through the one-way clutches 25 and 31.

For reverse the brake ring 38 is slipped rearwardly to hold the cage 7 and turbine rotor 30 against rotation. The clutch 27 is released. This will cause reverse rotation of the reaction rotor 26 and sun gear 32. As the cage 7 is held against rotation, it will cause a reverse rotation of the sun gear 33 and propeller shaft 11 but at a slower speed than that of the sun gear 32 and reaction rotor 26.

The construction shown in Fig. 4 is quite similar to that shown in Fig. 2. The torque converter 2 and clutch 27 may be identical with the torque converter 2 and clutch 27 shown in Fig. 2. The shaft 29 and tubular sleeve 24 correspond to the shaft 29 and tubular sleeve 24 of Fig. 2.

The planetary gearing comprises a duplex sun gear 42 rotatable with the tubular shaft 24, a ring gear 43 rotatable with the shaft 29, a gear carrier 44 rotatable with the propeller shaft 11, planet gears 45 mounted on the gear carrier 44 and meshing with the ring gear 43 and one of the sun gears 42, planet gears 46 meshing with the other sun gear 42, and a ring gear 47 rotatably mounted on the sleeve 24 and meshing with the planet gears 46. A brake 48 is provided for holding the ring gear 47 against rotation. A one-way clutch 49 and brake construction 50 is provided for holding the sun gears 42 against reverse rotation. A brake 51 may be provided for holding the sun gears 42 against rotation in the other direction. Because of the duplex gear 42, the planet gears 45 and 46 will rotate at the same speed, and the ring gears 43 and 47 will also rotate at the same speed. It follows that when the brake 48 is applied, both gears 43 and 47 will be held against rotation, thus holding the turbine rotor 30 against rotation.

With this construction for low speed forward drive, the clutch 27 is disconnected, the brakes 51 and 48 are released and the brake 50 is applied to hold the sun gears 42 against reverse rotation. The turbine rotor 30 is driven with variable torque increase to drive the ring gear 43. The gear carrier 44 and propeller shaft 11 are driven in a forward direction but at a lower speed than the ring gear 43. When the load becomes such that the fluid converter action is changed to fluid coupling action, the reaction turbine begins to rotate in the same direction as the impeller rotor.

For direct drive, eliminating the fluid drive, the clutch 27 is operated to connect the sun gears 42 with the pump rotor 28. The tubular sun gear shaft 42 carries the reaction rotor 26 through the one-way clutch 25 and the reaction rotor 26 carries the ring gear 43 with it through the one-way clutch 31 and shaft 29.

For reverse, the clutch 27 is operated to disconnect the sun gears 42 from the pump rotor 28. The brake 51 is released to enable the sun gears 42 to rotate in reverse. The brake 50 also is released to enable the sun gears 42 to rotate in reverse. The brake 48 is applied to hold the ring gears 47 and 43 as well as the turbine rotor 30 against rotation. With the turbine rotor held against rotation, the reaction rotor 26 will be driven in reverse, thus driving the sun gears 42 in reverse. Since the ring gears 47 and 43 are held against rotation, reverse rotation of the sun gears 42 will cause reverse rotation at a slower speed of the gear carrier 44 and shaft 11.

If desired the brake 51 acting on the driven casing of the clutch 27 may be used to force the transmission from direct drive down to lower speed drive. This might be useful in going downhill or in applying engine braking.

The construction shown in Fig. 5 comprises a drive shaft 52, a driven shaft 53, a front planetary gearing 54, a rear planetary gearing 55, a hydraulic torque converter 56, and a one-way friction clutch and brake construction 57 for controlling the rotation of the rear sun gear. The hydraulic torque converter comprises a vaned drive rotor 58, a vaned driven turbine 59, urged in the same direction as the drive rotor 58, and a vaned reaction turbine 60 urged in the opposite direction of rotation with respect to the drive rotor 58. The front planetary 54 comprises a gear carrier 61 keyed to the motor shaft, a plurality of planet gears 62 mounted on the gear carrier 61, a ring gear 63 rotatable with the drive rotor 58, and a sun gear 64 rotatable with the driven shaft. The turbine rotor 59 also is keyed to the driven shaft 53.

The rear planetary gearing 55 comprises a sun gear 65 having a one-way clutch connection 66 with the reaction rotor 60, a ring gear 67 keyed to the driven shaft 53, a gear carrier 68 rotatable on the sun gear sleeve 69, a one-way brake 70 acting on the sleeve 71 of the gear carrier 68, and a plurality of planet gears 72 mounted on the gear carrier 68 and meshing with the sun gear 65 and ring gear 67. If desired, a one-way friction clutch 73 and brake construction 74 may be provided for holding the reaction rotor 60 and sun gear 65 against reverse rotation when desired, and a friction clutch 75 for connecting the sun gear 65 to rotate with the drive rotor 58 when desired. If desired, a one-way clutch 76 may be provided between the sun gear sleeve 69 and the ring gear shaft 53.

With this construction, for low speed high torque drive, the clutch 75 and brake 74 are released. Part of the power flow from the drive shaft 52 to the driven shaft 53 bypasses the fluid transmission through the planet gears 62 and sun gear 64. The other part of the power flow is through the vaned drive rotor 58, reaction vaned rotor 60, and vaned turbine rotor 59. The power flow to the turbine rotor 59 acts directly on the driven shaft. The power flow to the reversely rotatable reaction rotor 60 goes to the tubular shaft 69, through the sun gear 65 and planet gears 72 to the ring gear 67, urging the ring gear 67 to rotate in the same direction in which the turbine rotor 59 urges it. The one-way anchor 70 holds the gear carrier 68 against reverse rotation. There are thus three paths of power flow to the shaft 53. If the load on the driven shaft 53 becomes so light that the reaction rotor 59 is urged by the impeller rotor 58 to rotate in a forward direction against the oppositively acting force on the sun gear 65, the converter action changes to coupler action. In general, the reaction of the reaction rotor 59 and the planet gear 55 is similar to the action of the corresponding parts of the patent to Weiss No. 2,005,444, dated June 18, 1935. If, however, it is desired to have two stages of converter action, the brake 74 is applied to the brake drum while the converter action is still effective. This will hold the sun gear 65 and reaction rotor 60 against reverse rotation and the fluid power flow will all be delivered to the ring gear 67 and shaft 53, the cage 68 freeing itself from the one-way anchor 70 and floating idly without any power transmission.

If it is desired to go into substantially direct drive, the brake 74 is released and the clutch 75 is connected to connect the sun gear 65 to rotate with the drive impeller 58. The drive impeller 58 will drive the propeller shaft 53 directly through the one-way clutches 73 and 76, thus eliminating all fluid power flow.

The construction shown in Fig. 6 comprises a drive shaft 52, a driven shaft 53, a front planetary gearing 54, a fluid torque converter 56, a rear planetary unit 55, and one-way friction clutch and brake construction described hereinafter. The hydraulic torque converter 56 and the front planetary unit 54 may be identical with that shown in Fig. 5. The rear planetary gearing comprises a gear carrier 77 mounted to rotate with a tubular shaft 78 to which the forward rotation turbine 59 is secured, a plurality of planet gears 79 mounted on this gear carrier, a ring gear 80 meshing with these planet gears and rotatable with the propeller shaft 53 and, a sun gear 81 meshing with the planet gears 79 and rotatable with a hollow shaft 82 having a one-way clutch connection 83 with the reaction vaned rotor 60 and having also a one-way clutch connection 84 with the sleeve 78 with which the gear carrier 77 rotates. The one-way friction clutch and brake structure comprises a drum 85 coaxial with the propeller shaft, a friction brake band 86 co-operating with this drum, a one-way clutch connection 87 between the sleeve of the drum and the sleeve 82 of the sun gear 81, and a friction clutch 88 for connecting the drum 85 with the drive rotor 63. A one-way brake or anchor 89 is provided for holding the gear carrier 77 and forward rotation turbine 59 against rearward rotation.

For low speed, high torque drive the clutch 88 and brake 86 are released. Part of the power flow from the drive shaft 52 to the driven shaft 53 bypasses the fluid transmission through the planet gears 62 and sun gear 64. The other part of the power flow from the motor shaft 52 is through the gear carrier 61, planet gears 62, ring gear 63, and fluid torque converter 56 to the rear planetary unit 55. The fluid flow through the torque converter is through the vaned drive rotor of the converter 56, reaction turbine 60, vaned turbine 59 and shaft 78 to the gear carrier 77. As the reaction rotor 60 is not held against reverse rotation, and as the gear carrier 77 and turbine rotor 59 are held against reverse rotation by the one-way brake or anchor 89, the reaction rotor 60 will be driven in a reverse direction, carrying with it the sun gear 81 through the action of the one-way clutch 83. The ring gear 80 will be driven in a forward direction with two torque multiplications in series; one, the torque multiplication between the drive rotor 63 and reaction rotor 60, and the other the torque multiplication between the sun gear 81 and the ring gear 80.

For higher speed lower torque multiplication the brake 86 is applied, holding the sun gear 81 and reaction rotor 60 against reverse rotation. The fluid power flow will then be from the drive rotor 63 through the reaction turbine 60 to the forward rotation turbine 59. This will cause forward rotation of the gear carrier 77 and forward rotation of the ring gear 80 and propeller shaft 53 at a higher speed than the gear carrier 77, as the sun gear 81 is held against reverse rotation by the one-way clutch 87 and is held against forward rotation by the fluid force acting on the reaction rotor 60. When the load and power supply become such that the reverse fluid urge of the reaction rotor 60 on the sun gear 81 becomes insufficient to overcome the forward urge of the planet gears 79 on the sun gear, the reaction rotor 60 and sun gear 81 will begin to rotate in a forward direction, and the fluid drive will change from torque converter to coupler action. In general, the above described action of the transmission corresponds to the action of the transmission shown in Fig. 2 of the patent to Pollard No. 2,293,358 dated August 18, 1942.

For direct drive the brake 86 is released and the clutch 88 is applied to connect the sun gear 81 to rotate with the drive rotor 63 through the action of the clutch 87. This rotation of the sun gear 81 causes forward rotation of the gear carrier 77 through the one-way clutch 84 between the sun gear sleeve 82 and the gear carrier sleeve 78. The transmission is then in direct drive.

In the constructions of Figs. 5 and 6, the bypassing of part of the power flow from the motor to the propeller shaft through the sun gear 64 increases the efficiency of the drive by bypassing part of the power flow around the fluid path.

Fig. 7 shows the torque speed efficiency curve obtained in a well-known converter used in coaches.

Fig. 8 shows the torque speed and efficiency curves which will be obtained using the torque converter corresponding to Fig. 7 in combination with the planetary transmission shown in Figs. 1 to 4, inclusive, of this application. This chart shows a relatively high starting torque and a high efficiency curve between ten and thirty miles per hour with 100 per cent efficiency transmission between 30 and 45 miles per hour.

Further modifications will be apparent to those skilled in the art and it is desired, therefore, that the invention be limited only by the scope of the appended claims.

Having thus described my invention, what I claim and desire to secure by Letters Patent is:

1. A hydro-planetary gear transmission comprising a hydraulic torque converter and a planetary gearing, said torque converter comprising a pump rotor and two turbines, one of said turbines being driven in the same direction as the pump rotor when the other turbine is held against reverse rotation and the other turbine being driven in a direction reverse to that of the pump rotor when said one turbine is held against rotation, said transmission means having means for releasably holding said turbines against said rotations including a one-way anchorage for holding said other turbine against reverse rotation releasable to enable reverse rotation of said other turbine, said planetary gearing comprising at least three elements including (1) a first gear, (2) a second gear, and (3) a planet gear element geared to both of said gears, the first one of said elements being driven in a forward direction by said one turbine, the second one of said elements being driven in a reverse direction by said other turbine, and means for connecting said second element to rotate with said pump rotor.

2. A hydro-planetary gear transmission comprising a hydraulic torque converter and a planetary gearing, said torque converter comprising a pump rotor and two turbines, one of said turbines being driven in the same direction as the pump rotor when the other turbine is held against reverse rotation and the other turbine being driven in a direction reverse to that of the pump rotor when said one turbine is held against rotation, said transmission means having means for releasably holding said turbines against said rotations including a one-way anchorage for holding said other turbine against reverse rotation releasable to enable reverse rotation of said other turbine, said planetary gearing comprising at least three elements including (1) a first gear, (2) a second gear, and (3) a planet gear element geared to both of said gears, the first one of said elements being driven in a forward direction by said one turbine, the second one of said elements being driven in a reverse direction by said other turbine, and means for connecting said first and second elements to rotate in unison with said pump rotor.

3. A hydro-planetary gear transmission comprising a hydraulic torque converter and a planetary gearing, said torque converter comprising a pump rotor and two turbines, one of said turbines being driven in the same direction as the pump rotor when the other turbine is held against reverse rotation and the other turbine being driven in a direction reverse to that of the pump rotor when said one turbine is held against rotation, said transmission means having means for releasably holding said turbines against said rotations including a one-way anchorage for holding said other turbine against reverse rotation releasable to enable reverse rotation of said other turbine, said planetary gearing comprising at least three elements including (1) a first gear, (2) a second gear, and (3) a planet gear element geared to both of said gears, the first one of said elements being driven in a forward direction by said one turbine, the second one of said elements being driven in a reverse direction by said other turbine, and clutch means for connecting said second element to rotate with said pump rotor.

4. A hydro-planetary gear transmission comprising a hydraulic torque converter and a planetary gearing, said torque converter comprising a pump rotor and two turbines, one of said turbines being driven in the same direction as the pump rotor when the other turbine is held against reverse rotation and the other turbine being driven in a direction reverse to that of the pump rotor when said one turbine is held against rotation, said transmission means having means for releasably holding said turbines against said rotations including a one-way anchorage for holding said other turbine against reverse rotation releasable to enable reverse rotation of said other turbine, said planetary gearing comprising at least three elements including (1) a first gear, (2) a second gear, and (3) a planet gear element geared to both of said gears, the first one of said elements being driven in a forward direction by said one turbine, the second one of said elements being driven in a reverse direction by said other turbine, and clutch means for connecting said first and second elements to rotate in unison with said pump rotor.

5. A hydro-planetary gear transmission comprising a hydraulic torque converter and a planetary gearing, said torque converter comprising a pump rotor and two turbines, one of said turbines being driven in the same direction as the pump rotor when the other turbine is held against reverse rotation and the other turbine being driven in a direction reverse to that of the pump rotor when said one turbine is held against rotation, said transmission means having means for releasably holding said turbines against said rotations including an anchorage for holding said other turbine against reverse rotation releasable to enable reverse rotation of said other turbine, said planetary gearing comprising at least three elements including (1) a first gear, (2) a second gear, and (3) a planet gear element geared to both of said gears, the first one of said elements being driven in a forward direction by said one turbine, the second one of said elements being driven in a reverse direction by said other turbine, and means for connecting said second element to rotate with said pump rotor.

6. A hydro-planetary gear transmission comprising a hydraulic torque converter and a planetary gearing, said torque converter comprising a pump rotor and two turbines, one of said turbines being driven in the same direction as the pump rotor when the other turbine is held against reverse rotation and the other turbine being driven in a direction reverse to that of the pump rotor when said one turbine is held against rotation, said transmission means having means for releasably holding said turbines against said rotations including an anchorage for holding said other turbine against reverse rotation releasable to enable reverse rotation of said other turbine, said planetary gearing comprising at least three elements including (1) a first gear, (2) a second gear, and (3) a planet gear element geared to both of said gears, the first one of said elements being driven in a forward direction by said one turbine, the second one of said elements being driven in a reverse direction by said other turbine, and means for connecting said first and second elements to rotate in unison with said pump rotor.

7. A hydro-planetary gear transmission comprising a hydraulic torque converter and a planetary gearing, said torque converter comprising a pump rotor and two turbines, one of said turbines being driven in the same direction as the pump rotor when the other turbine is held against reverse rotation and the other turbine being driven in a direction reverse to that of the pump rotor when said one turbine is held against rotation, said transmission means having means for releasably holding said turbines against said rotations including an anchorage for holding said other turbine against reverse rotation releasable to enable reverse rotation of said other turbine, said planetary gearing comprising at least three elements including (1) a first gear, (2) a second gear, and (3) a planet gear element geared to both of said gears, the first one of said elements being driven in a forward direction by said one turbine, the second one of said elements being driven in a reverse direction by said other turbine, and clutch means for connecting said second element to rotate with said pump rotor.

8. A hydro-planetary gear transmission comprising a hydraulic torque converter and a planetary gearing, said torque converter comprising a pump rotor and two turbines, one of said turbines being driven in the same direction as the pump rotor when the other turbine is held against reverse rotation and the other turbine being driven in a direction reverse to that of the pump rotor when said one turbine is held against rotation, said transmission means having means for releasably holding said turbines against said rotations including an anchorage for holding said other turbine against reverse rotation releasable to enable reverse rotation of said other turbine, said planetary gearing comprising at least three elements including (1) a first gear, (2) a second gear, and (3) a planet gear element geared to both of said gears, the first one of said elements being driven in a forward direction by said one turbine, the second one of said elements being driven in a reverse direction by said other turbine, and clutch means for connecting said first and second elements to rotate in unison with said pump rotor.

9. A turbo-planetary transmission comprising a torque converter including a pump rotor, a turbine rotor, a one-way turbostator, one-way anchorage means for holding said turbostator against reverse rotation, a sun gear, a power output ring gear, a gear carrier, planet gearing carried by said gear carrier and meshing with said sun gear and ring gear, said sun gear being connected to rotate in unison with said turbostator, a drive shaft for driving said pump rotor, and a shaft driven by said turbine rotor, said gear carrier being connected to said second one of said shafts to rotate in unison therewith, whereby force exerted on said sun gear by said planet gearing tends to cause rotation of said one-way rotatable turbostator, said transmission further including a two-path divided variably differentiated power flow means supplied with power from the said drive shaft, both of said paths lying between said drive shaft and said power output ring gear and supplying power to said ring gear, said one path including the torque converter, the said other path by-passing the torque converter and comprising rotatable power flow means coaxial with said drive shaft.

10. A turbo-planetary transmission comprising a torque converter including a pump rotor, a turbine rotor, a one-way turbostator, one-way anchorage means for holding said turbostator against reverse rotation, a sun gear, a power output ring gear, a gear carrier, planet gearing carried by said gear carrier and meshing with said sun gear and ring gear, said sun gear being connected to rotate in the same direction as said turbostator, a drive shaft for driving said pump rotor, and a shaft driven by said turbine rotor, said gear carrier being connected to said second one of said shafts to rotate in unison therewith, whereby force exerted on said sun gear by said planet gearing tends to cause rotation of said one-way rotatable turbostator, said transmission further including a two-path divided variably differentiated power flow means supplied with power from the said drive shaft, both of said paths lying between said drive shaft and said power output ring gear and supplying power to said ring gear, said one path including the torque converter, the said other path by-passing the torque converter and comprising rotatable power flow means coaxial with said drive shaft.

References Cited in the file of this patent
UNITED STATES PATENTS

| Number | Name | Date |
|---|---|---|
| 2,293,358 | Pollard | Aug. 18, 1942 |
| 2,298,648 | Russell | Oct. 13, 1942 |
| 2,456,328 | Schneider | Dec. 14, 1948 |